United States Patent
Sidwell et al.

(10) Patent No.: US 10,584,506 B2
(45) Date of Patent: Mar. 10, 2020

(54) NON-CONTACT LIQUID SEALING ACTUATOR SYSTEM

(71) Applicant: SURF LAKES HOLDINGS LTD, Queensland (AU)

(72) Inventors: Christopher Roy Sidwell, Queensland (AU); Aaron James Trevis, Queensland (AU)

(73) Assignee: SURF LAKES HOLDINGS LTD, Queensland (AU)

( * ) Notice: Subject to any disclaimer, the term of this patent is extended or adjusted under 35 U.S.C. 154(b) by 0 days.

(21) Appl. No.: 16/340,500

(22) PCT Filed: Nov. 22, 2017

(86) PCT No.: PCT/AU2017/051287
§ 371 (c)(1),
(2) Date: Apr. 9, 2019

(87) PCT Pub. No.: WO2018/094459
PCT Pub. Date: May 31, 2018

(65) Prior Publication Data
US 2019/0234090 A1    Aug. 1, 2019

(30) Foreign Application Priority Data
Nov. 22, 2016    (AU) ............................ 2016904777

(51) Int. Cl.
*F04D 35/00*    (2006.01)
*A63B 69/12*    (2006.01)
(Continued)

(52) U.S. Cl.
CPC .......... *E04H 4/0006* (2013.01); *A63B 69/00* (2013.01); *A63B 69/125* (2013.01); *F04D 35/00* (2013.01); *F16J 15/3244* (2013.01)

(58) Field of Classification Search
CPC ........ E04H 4/006; A63B 69/125; F04D 35/00
(Continued)

(56) References Cited

U.S. PATENT DOCUMENTS 3,789,612 A * 2/1974 Richard ................ E04H 4/0006
                                                                    405/79
3,973,405 A * 8/1976 Duport ...................... E02B 1/02
                                                                    405/79
(Continued)

FOREIGN PATENT DOCUMENTS

WO    2013050047 A1    4/2013
WO    2015188219 A1    12/2015

OTHER PUBLICATIONS

International Patent Application No. PCT/AU2017/051287, International Search Report, dated Feb. 28, 2018.
(Continued)

*Primary Examiner* — Frederick L Lagman
(74) *Attorney, Agent, or Firm* — Cooper Legal Group, LLC (57) ABSTRACT

A liquid sealing actuator system enables use in a non-contact or low-friction manner. The system includes: an inner shaft having a first end; a hollow outer shaft having a first end that receives the first end of the inner shaft; at least one sealing ring positioned adjacent an internal surface of the hollow outer shaft, wherein the at least one sealing ring has an outer diameter that is less than an inner diameter of the outer shaft, thereby defining an annular seal gap; a mass attached to a distal end of either the inner shaft or the outer shaft; and a pressure source that injects a pressurised fluid into the hollow outer shaft, thereby applying a pressure against both the first end of the inner shaft and the at least one sealing ring that assists in lifting the mass; wherein the system is at least partially immersed in an external liquid such that the at least one sealing ring is submerged in the external liquid and a (Continued)

head of the external liquid above the at least one sealing ring defines a backpressure in the annular seal gap that opposes the pressure applied by the pressure source.

20 Claims, 9 Drawing Sheets

(51) Int. Cl.
    *E04H 4/12*     (2006.01)
    *E04H 4/00*     (2006.01)
    *A63B 69/00*     (2006.01)
    *F16J 15/3244*     (2016.01)

(58) Field of Classification Search
    USPC .......................................................... 405/79
    See application file for complete search history.

(56) References Cited

U.S. PATENT DOCUMENTS

| | | | | |
|---|---|---|---|---|
| 4,276,664 A * | 7/1981 | Baker | ................. | E04H 4/0006 4/491 |
| 4,810,129 A * | 3/1989 | Guevel | ................. | E04H 4/0006 4/491 |
| 4,976,570 A * | 12/1990 | Davis | ..................... | F04D 35/00 4/491 |
| 8,464,527 B2 | 6/2013 | Gerber et al. | | |
| 2005/0084333 A1 * | 4/2005 | Zadig | ................... | F03B 13/187 405/79 |
| 2009/0121486 A1 | 5/2009 | Ganley | | |
| 2010/0135726 A1 * | 6/2010 | Clauss | ................ | A01K 63/006 405/79 |
| 2011/0289913 A1 | 12/2011 | Welch, Jr. et al. | | |
| 2012/0117957 A1 | 5/2012 | Travis | | |
| 2012/0255112 A1 * | 10/2012 | Osterman | ............ | E04H 4/0006 4/491 |
| 2014/0014318 A1 | 1/2014 | Mail | | |
| 2015/0321223 A1 * | 11/2015 | McIlwraith | ............... | F42D 3/06 92/61 |
| 2017/0204627 A1 * | 7/2017 | Trevis | ................... | A63B 69/00 |

OTHER PUBLICATIONS

International Patent Application No. PCT/AU2017/051287, Written Opinion, dated Feb. 28, 2018.

\* cited by examiner

NON-CONTACT LIQUID SEALING ACTUATOR SYSTEM

BACKGROUND TO THE INVENTION

As described in the international patent application publication no. WO 2015/188219, titled Surfing Wave Generation, various methods and systems have been proposed for creating wave pools and artificial surfing facilities. However, the extremely large forces required to generate large waves in a consistent and reliable manner, present significant technical challenges regarding wave generating system architectures, energy efficiency and mechanical wear.

Solutions that overcome the above technical challenges also can be useful for other applications employing waves and/or the effective transfer of large amounts of liquid.

There is therefore a need for an improved non-contact liquid sealing actuator system.

SUMMARY OF THE INVENTION

According to one aspect, the invention is a liquid sealing actuator system, comprising:

an inner shaft having a first end;

a hollow outer shaft having a first end that receives the first end of the inner shaft;

at least one sealing ring positioned adjacent an internal surface of the hollow outer shaft, wherein the at least one sealing ring has an outer diameter that is less than an inner diameter of the outer shaft, thereby defining an annular seal gap;

a mass attached to a distal end of either the inner shaft or the outer shaft; and a pressure source that injects a pressurised fluid into the hollow outer shaft, thereby applying a pressure against both the first end of the inner shaft and the at least one sealing ring that assists in lifting the mass;

wherein the system is at least partially immersed in an external liquid such that the at least one sealing ring is submerged in the external liquid and a head of the external liquid above the at least one sealing ring defines a back-pressure in the annular seal gap that opposes the pressure applied by the pressure source.

Preferably, the mass defines a central wave device that oscillates vertically in the external liquid.

Preferably, the central wave device generates waves in the external liquid.

Preferably, the system further comprises:

a sealing subsystem to which the at least one sealing ring is attached; and a plurality of wall spacing devices connected to the sealing subsystem, where some of the wall spacing devices are positioned above the at least one sealing ring and some of the wall spacing devices are positioned below the at least one sealing ring.

Preferably, the central wave device has a mass of greater than 500 tonnes.

Preferably, the central wave device has a mass of less than 100 tonnes.

Preferably, the pressurised fluid and the external liquid are both water.

Preferably, the pressurised fluid is air and the external liquid is water.

Preferably, the at least one sealing ring comprises a plurality of sealing rings that are concentrically positioned along a longitudinal axis of the inner shaft.

Preferably, the plurality of sealing rings are spaced apart by spacer hubs concentrically positioned along the longitudinal axis of the inner shaft.

Preferably, the plurality of sealing rings comprises 2 to 30 sealing rings.

Preferably, each sealing ring in the plurality of sealing rings comprises a plurality of identical interconnected segments.

Preferably, the plurality of sealing rings are adjustably attached to the inner shaft.

Preferably, the plurality of sealing rings are adjustably bolted to a piston ring that is fixed to the inner shaft.

Preferably, a vertical operating range of the distal end of the outer shaft extends above a level of the external liquid, and the distal end of the inner shaft is connected to a ground support.

Preferably, a vertical operating range of the distal end of the inner shaft extends above a level of the external liquid, and the distal end of the outer shaft is connected to a ground support.

Preferably, the inner shaft and the outer shaft are cylinders.

Preferably, during use, the inner shaft oscillates in and out of the outer shaft in a contactless manner, where the at least one sealing ring does not contact the inner surface of the outer shaft.

Preferably, the inner shaft and the outer shaft can rotate independently about their longitudinal axis.

Preferably, a ratio of the annular seal gap divided by the outer diameter of the at least one sealing ring is less than 0.01 (or 1%), wherein the pressurised fluid and the external liquid are both water.

Preferably, a ratio of the annular seal gap divided by the outer diameter of the at least one sealing ring is less than 0.0005 (or 0.05%), wherein the pressurised fluid and the external liquid are both water.

Preferably, a ratio of the annular seal gap divided by the outer diameter of the at least one sealing ring is less than 0.01 (or 1%), wherein the pressurised fluid is air and the external liquid is water.

Preferably, the inner shaft is centrally positioned below the mass.

Preferably, a plurality of inner and outer shaft systems support the mass.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

DETAILED DESCRIPTION OF THE PREFERRED EMBODIMENT

The present invention relates to a non-contact liquid sealing actuator system. Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this patent specification, adjectives such as first and second, left and right, top and bottom, upper and lower, rear, front and side, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

According to one aspect, the present invention is defined as a liquid sealing actuator system, comprising: an inner shaft having a first end; a hollow outer shaft having a first end that telescopically receives the first end of the inner shaft; at least one sealing ring positioned adjacent an external surface of the inner shaft, wherein the at least one sealing ring has an outer diameter that is less than an inner diameter of the outer shaft, thereby defining an annular seal gap; a mass attached to a distal end of either the inner shaft or the outer shaft; and a pressure source that injects a pressurised fluid into the hollow outer shaft, thereby applying an outward pressure against both the first end of the inner shaft and the at least one sealing ring that assists in lifting the mass; wherein the system is at least partially immersed in an external liquid such that the at least one sealing ring is submerged in the external liquid and a head of the external liquid above the at least one sealing ring defines a backpressure in the annular seal gap that opposes the outward pressure applied by the pressure source.

Advantages of some embodiments of the present invention include a robust and efficient liquid sealing actuator system that can be used in a non-contact or low-friction manner. Different embodiments of the invention can be used at various scales for various applications, including for example: wave generation for surfing and/or water play; wave generation for rapid irrigation and/or flooding of plain lands or channels; marine testing for tsunami scenarios; wave generation for film making; wave generation for large aquariums for imitating a natural ocean environment; and driving large piles/screw piles in soft soil and/or marine environments at low noise levels.

Figure 1:
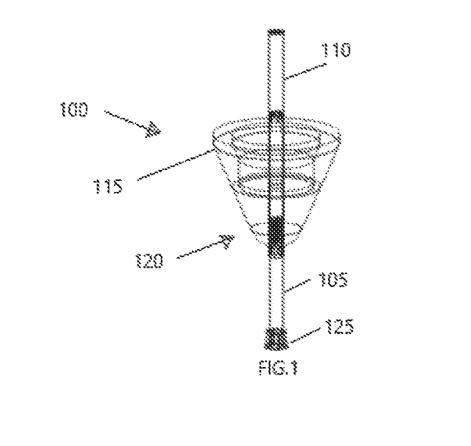
FIG. 1 is a side perspective view of a non-contact liquid sealing actuator system, according to one embodiment of the present invention.

FIG. 1 is a side perspective view of a non-contact liquid sealing actuator system 100, according to one embodiment of the present invention. The system 100 includes an inner shaft 105 that is partially received in a hollow outer shaft 110. The hollow outer shaft 110 extends through and is attached to a mass in the form of a central wave device 115. A sealing subsystem 120 is connected to the inner shaft 105 and provides a non-contact seal between an outer wall of the inner shaft 105 and an inner wall of the outer shaft. A base 125 of the inner shaft 105 is fixed to a ground support, such as at the bottom of a wave pool.

Similar to the plungers 12, 22 described in publication WO 2015/188219 of international patent application no. PCT/AU2015/000344, filed on 9 Jun. 2015 and herein incorporated by reference in its entirety, in use according to one embodiment the central wave device 115 oscillates vertically into a body of fluid, generating concentric waves in the fluid that radiate outward from the central wave device 115. By sequentially pressurising the hollow cavity inside the outer shaft 110, an upward force is applied to the distal end of the outer shaft 110 and lifts the central wave device 115. When the pressure is released the central wave device 115 falls under the force of gravity into the body of fluid and generates concentric waves in the fluid.

Figure 2:
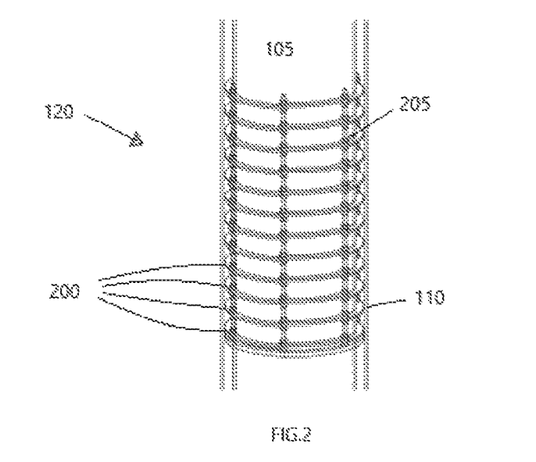
FIG. 2 is a close up perspective side view of a sealing subsystem of the actuator system of FIG. 1.

FIG. 2 is a close up perspective side view of the sealing subsystem 120. The sealing subsystem 120 includes a plurality of sealing rings 200 that are adjustably connected to the inner shaft 105. As shown, each sealing ring 200 comprises six identical interconnected segments, where each segment defines a 60 degree arc. The segments of each sealing ring 200 are bolted together and bolted to adjacent sealing rings 200 using bolts 205 that extend longitudinally along the outer surface of the inner shaft 105. The bolts 205 enable easy adjustment, maintenance and/or replacement of the sealing rings 200.

An outer diameter of each sealing ring 200 is less than an inner diameter of the outer shaft 110, thereby defining an annular seal gap. By balancing the central wave device 115 above the inner shaft 105, the central wave device 115 is able to oscillate up and down without the sealing rings 200 contacting the inner surface of the outer shaft 110, enabling non-contact and thus non-wearing, telescopic, oscillating motion of the inner shaft 105 in and out of the outer shaft 110.

For example, in a large surf wave park, the central wave device 115 can be a huge mass of between 500 to 1500 tonnes. Thus smooth, relatively frictionless operation of the actuator system 100 can dramatically raise efficiency, lower operating costs, reduce undesirable noise and increase the enjoyment of the park users.

Pressure inside of the hollow outer cylinder 110 can be provided, for example, from a supply pipe that extends up through the base of the inner shaft 105 and which injects either air or a liquid into the outer cylinder 110. In some embodiments, the water in which the actuator system 100 is partially immersed is also used as the liquid that pressurises the outer cylinder 110. For example, typical pressures employed in an actuator used at a surf park can be in the range from 100 kPa to 1000 kPa gauge pressure. Such pressures can be sourced for example from a head of water in a tower and/or another pressurised water source.

Figure 3:
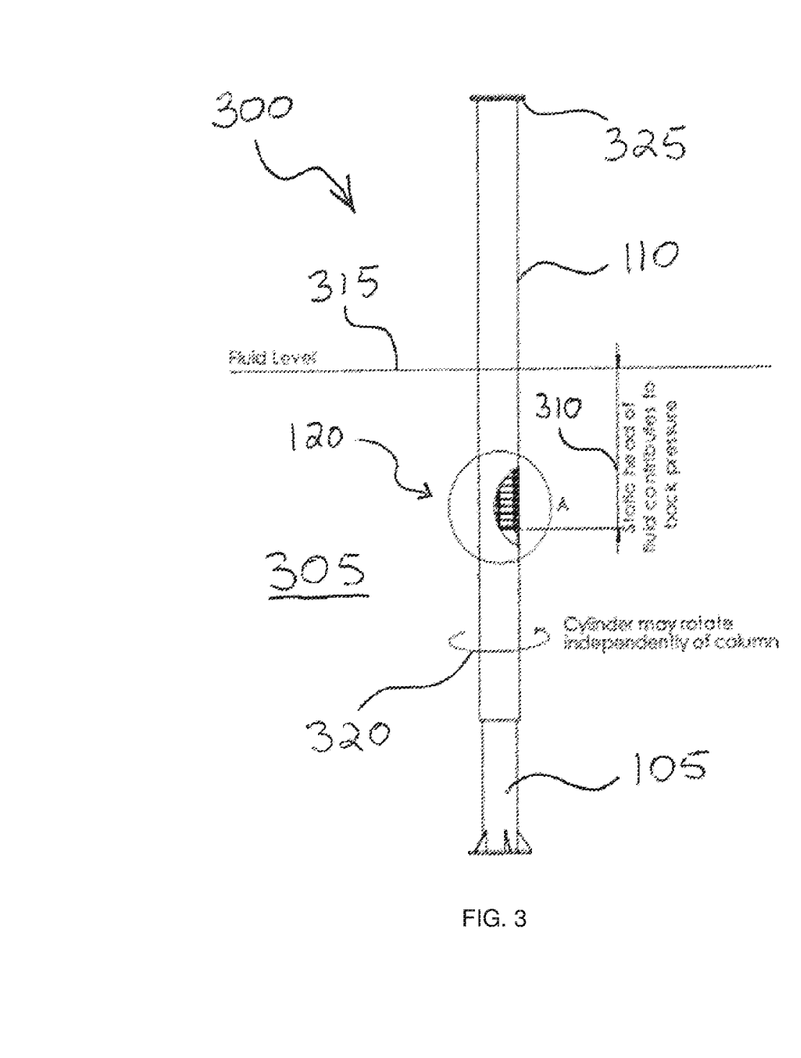
FIG. 3 is a side view of a non-contact liquid sealing actuator system, which is similar to the system of FIG. 1 but where for clarity a mass connected to the system is not shown.

FIG. 3 is a side view of a non-contact liquid sealing actuator system 300, which is similar to the system 100 but where for clarity a mass connected to the system 300 is not shown. The system 300 is shown partially immersed in an external liquid 305 such as water. A head 310 of the external liquid 300 between a lower end of the sealing subsystem 120 and a level 315 of the external liquid 300 defines a backpressure in the annular seal gap that opposes the outward pressure applied by the pressure source. That improves the effectiveness of the seal and enables the annular seal gap to be larger, which assists in providing non-contacting relative motion between the inner shaft 105 and the outer shaft 110.

As shown by the arrow 320, the outer shaft 110, and a mass such as the central wave device 115 (not shown in FIG. 3), can rotate independently of the inner shaft 105. Such rotation capability can be used, for example, in conjunction with a customised shape of a central wave device to provide variations in the shape and nature of the resulting waves generated by the central wave device.

A distal end 325 of the outer shaft 110 can include a cap or portal for maintenance access to the interior of the outer shaft 110.

Figure 4:
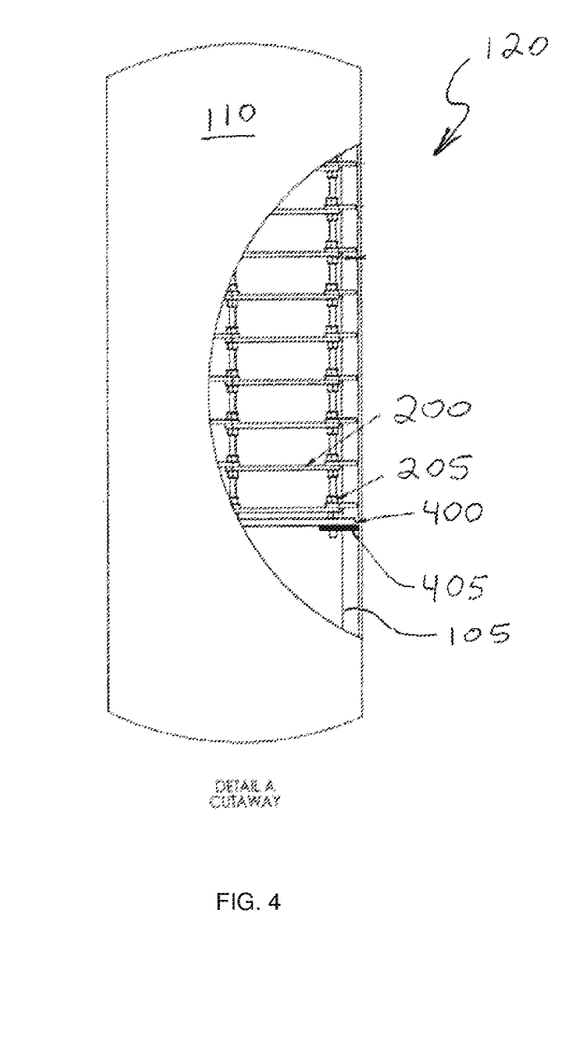
FIG. 4 is a detailed side view of the sealing subsystem of the actuator system of FIG. 3.

FIG. 4 is a detailed side view of the sealing subsystem 120 of the actuator system 300. A piston ring 400 can be permanently welded or otherwise attached to the inner shaft 105. The segments that define the sealing rings 200 are then bolted to the piston ring 400 using the bolts 205. The piston ring 400 thus also functions as an additional seal.

An additional flexible seal 405, such as a polymeric seal, is shown connected to the piston ring 400 at a lower end of the sealing subsystem 120. Such an additional flexible seal 405 can further improve the effectiveness of the sealing subsystem 120 and can be designed to be easily replaced.

It will be appreciated that in some applications, such as wave pools and surf parks, sound emanating from an actuator system 100, 300 can add substantially to the excitement of the environment. Thus the systems 100, 300 therefore can be tuned, particularly through modification of the sealing subsystem 120 and the relative width of the annular seal gap, to create exciting sounds of rushing water and/or air when the central wave device 115 oscillates up and down.

Figure 5:
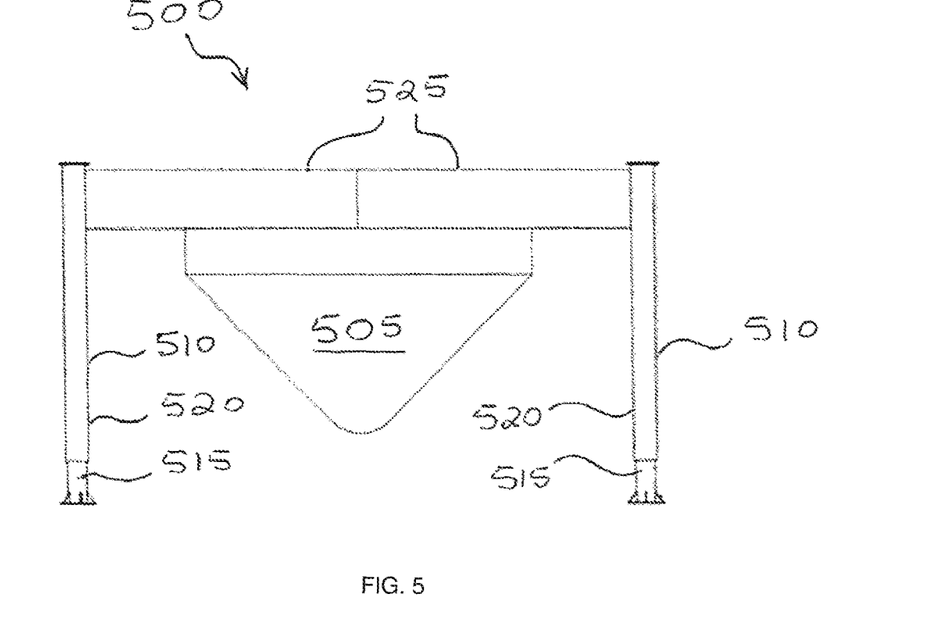
FIG. 5 is a side view of a non-contact liquid sealing actuator system, according to an alternative embodiment of the present invention.

FIG. 5 is a side view of a non-contact liquid sealing actuator system 500, according to an alternative embodiment of the present invention. The system 500 includes a mass in the form of a central wave device 505 that is supported by a plurality of inner and outer shaft systems 510. Each system 510 includes a telescoping inner shaft 515 and an outer shaft 520 that are sealed according to the non-contact methods described herein. An array of horizontal supports 525 extend between the central wave device 505 and each of the shaft systems 510.

Figure 6:
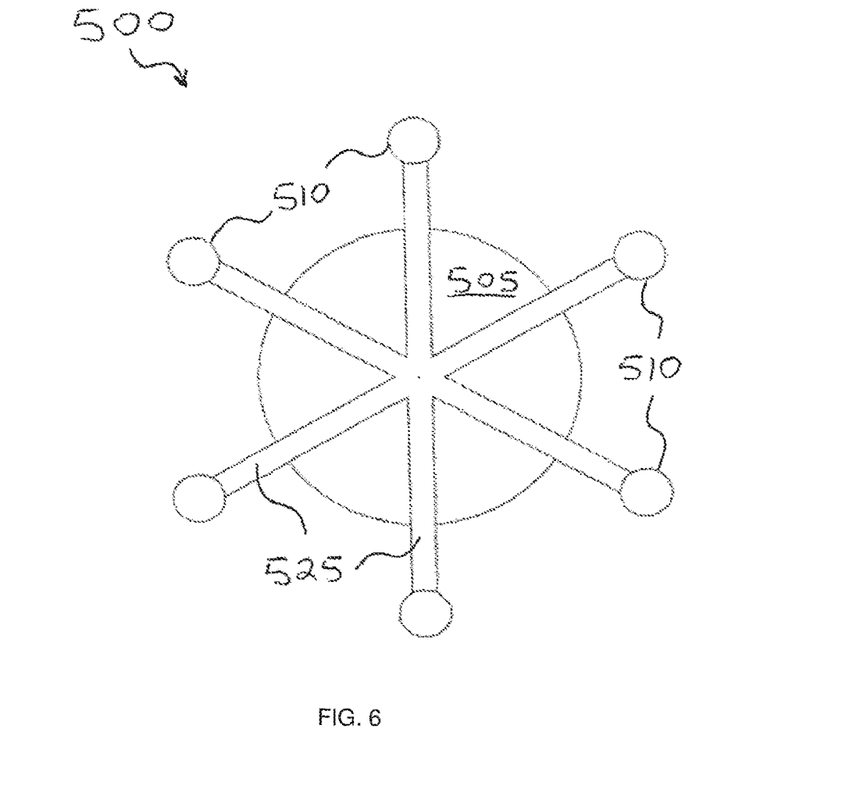
FIG. 6 is a top view of the actuator system of FIG. 5.

FIG. 6 is a top view of the actuator system 500. The load of the central wave device 505 is divided between the six shaft systems 510, and all of the shaft systems 510 are synchronised and work together to lift and release the central wave device 505, enabling a smooth, vertical oscillation of the central wave device 505 up and down in a liquid medium, such as the water of a wave pool.

Figure 7:
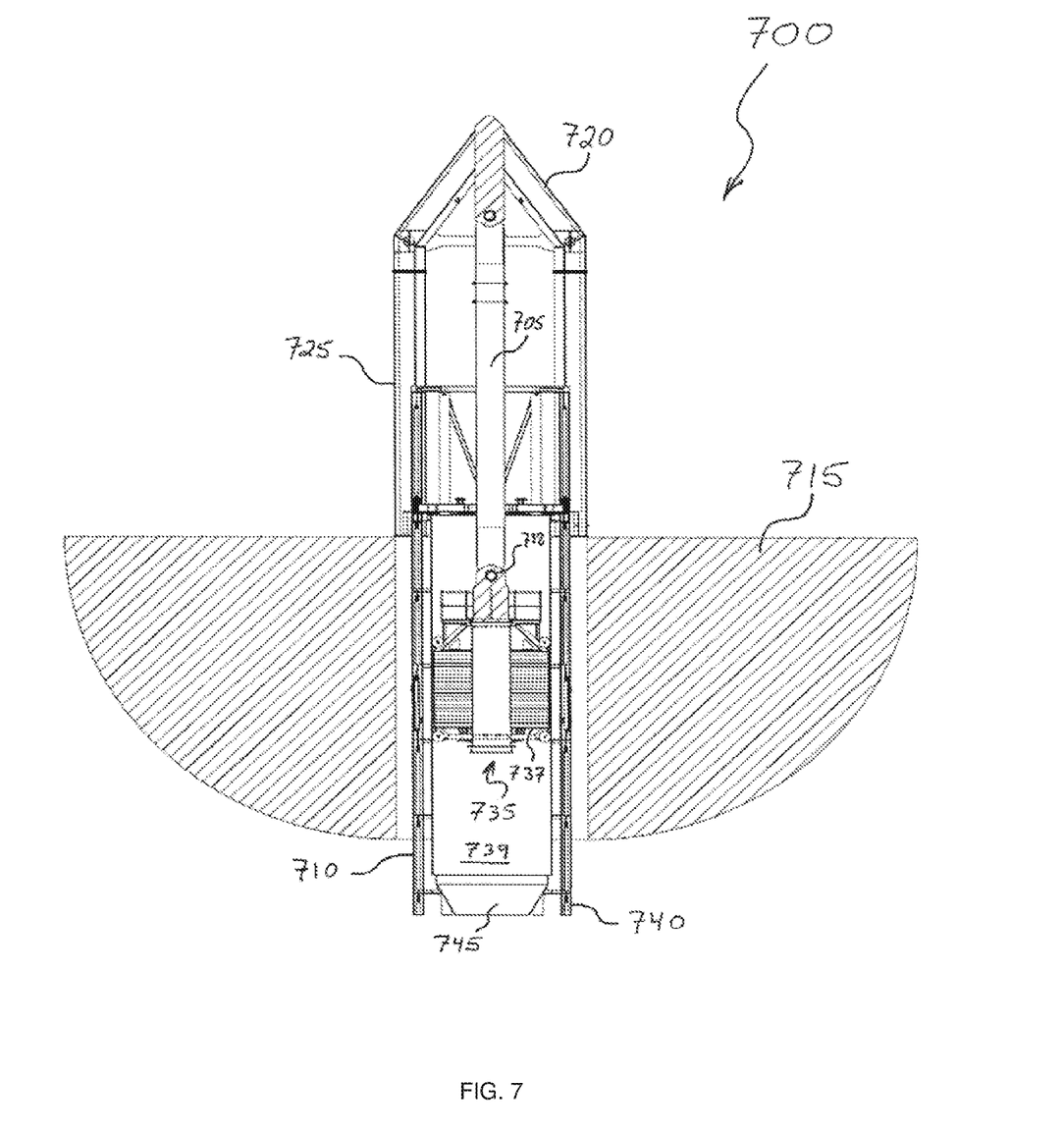
FIG. 7 is a cross-sectional side view of a non-contact liquid sealing actuator system, according to another embodiment of the present invention.

FIG. 7 is a cross-sectional side view of a non-contact liquid sealing actuator system 700, according to another embodiment of the present invention. The system 700 includes an inner shaft 705 that is partially received in a hollow outer shaft 710. The hollow outer shaft 710 extends through a centre hole of a mass in the form of an annular central wave device 715.

Those skilled in the art will appreciate that the annular central wave device 715 can be of various shapes and comprise various materials so as to most effectively generate concentric waves, depending on the application.

A top end of the inner shaft 705 is connected to a cap 720 having a cylindrical wall 725 that receives the hollow outer shaft 710. A sealing subsystem 735 including a piston ring 737 is connected to a lower distal end of the inner shaft 705 at pivot point 738 and provides a non-contact seal between a cylinder cavity 739 and an inner wall of the outer shaft 710. The annular central wave device 715, cap 720, inner shaft 705 and sealing subsystem 735 thus all oscillate together up and down relative to the hollow outer shaft 710. A base 740 of the hollow outer shaft 710 is fixed to a ground support, such as at the bottom of a wave pool.

Piping 745 directs high pressure liquid into cylinder cavity 739. The resulting pressure in the cylinder cavity 739 exerts an upward force on the piston ring 737, which then lifts the sealing subsystem 735, inner shaft 705, cap 720 and central wave device 715 upward.

Figure 8:
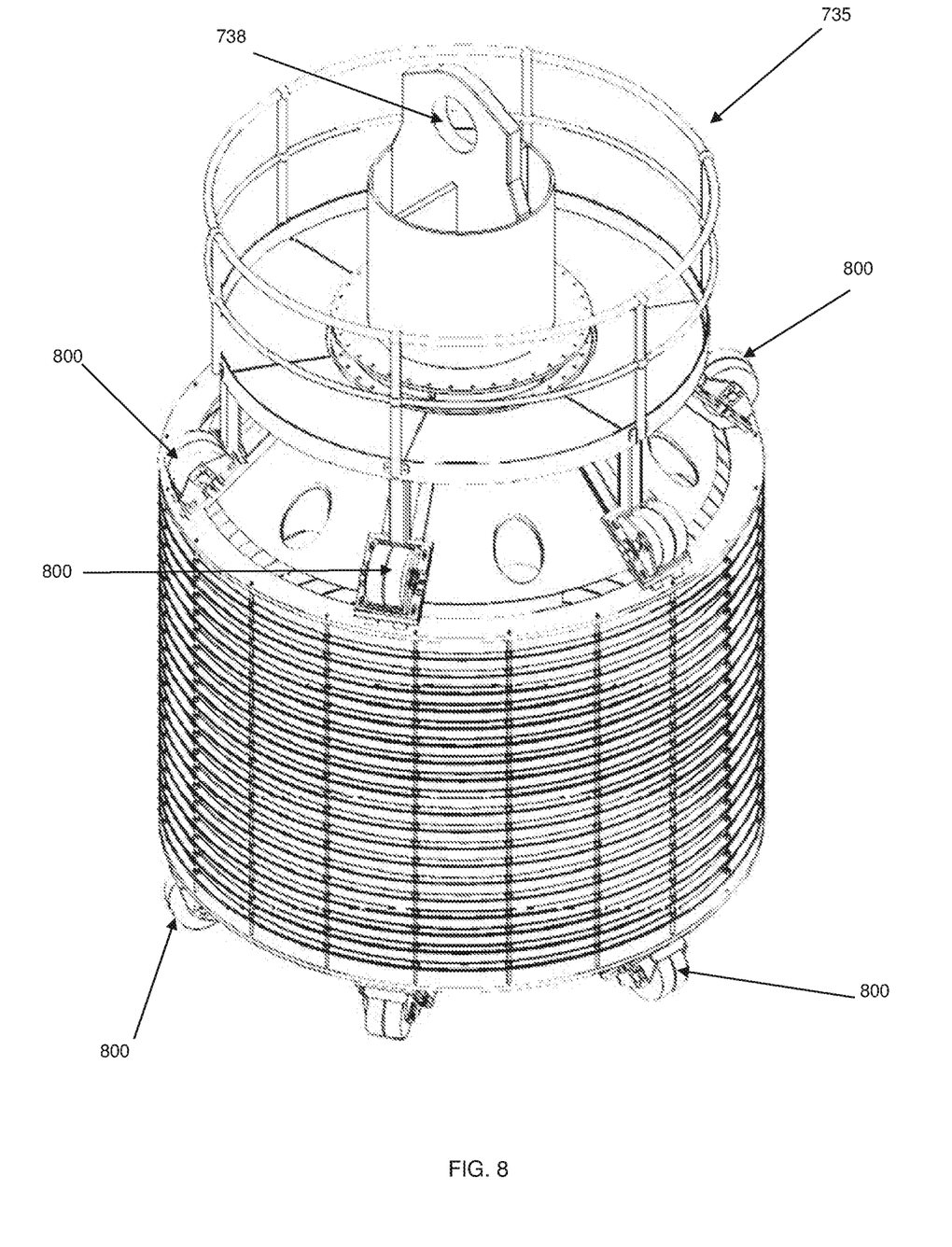
FIG. 8 is a perspective view of the sealing subsystem of the embodiment of FIG. 7.

FIG. 8 is a perspective view of the sealing subsystem 735. A plurality of wall spacing devices in the form of rollers 800 are connected to the sealing subsystem 735 and roll against the inside wall of the hollow outer shaft 710, thereby guiding vertical movement of the sealing subsystem 735 up and down the hollow outer shaft 710.

Those skilled in the art will appreciate that, according to various embodiments of the present invention, the rollers 800 can be of various sizes and configurations, or can be replaced by skid pads or other types of wall spacing devices for preventing other components of the sealing subsystem 735 from impacting the inside wall of the hollow outer shaft 710.

Figure 9:
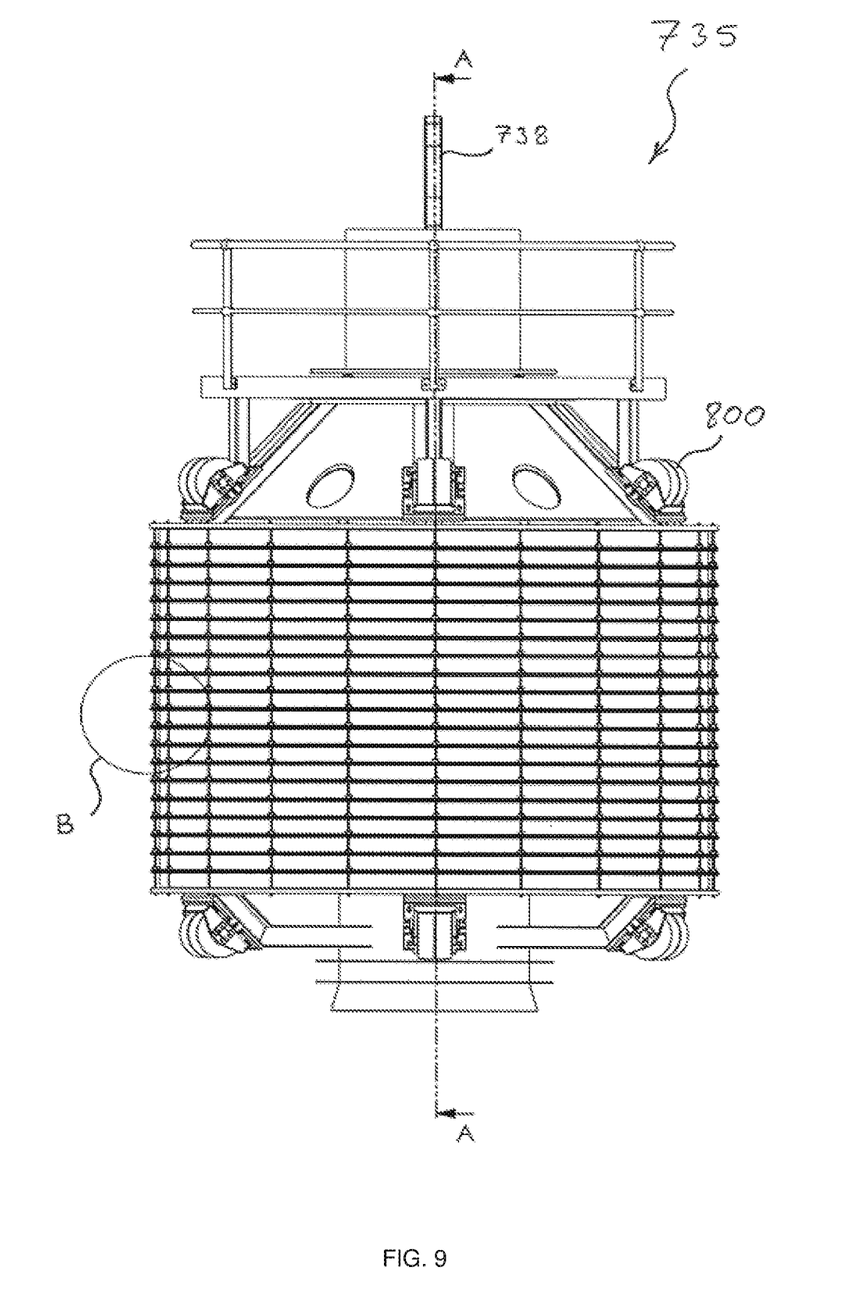
FIG. 9 is a partial cutaway side view of the sealing subsystem of the embodiment of FIG. 7.

FIG. 9 is a partial cutaway side view of the sealing subsystem 720, including a cross-section line A and a circle defining Detail View B.

Figure 10:
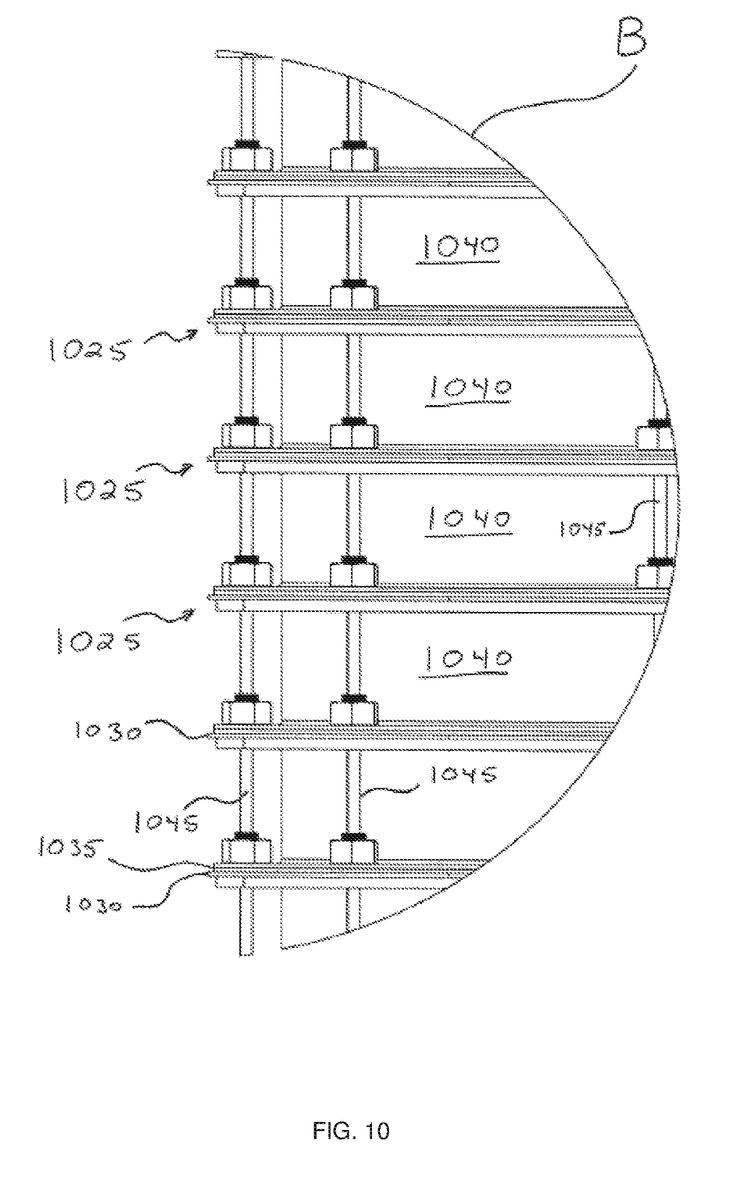
FIG. 10 is a close up of Detail View B from FIG. 9.

FIG. 10 is a close up of Detail View B from FIG. 9. As shown, the sealing subsystem 735 comprises a plurality of sealing ring assemblies 1025. Each sealing ring assembly 1025 comprises a flexible sealing ring 1030 that is clamped against an upper lateral flange 1035 of a spacing hub 1040. The sealing ring assemblies 1025 are connected together by vertical rods 1045.

Figure 11:
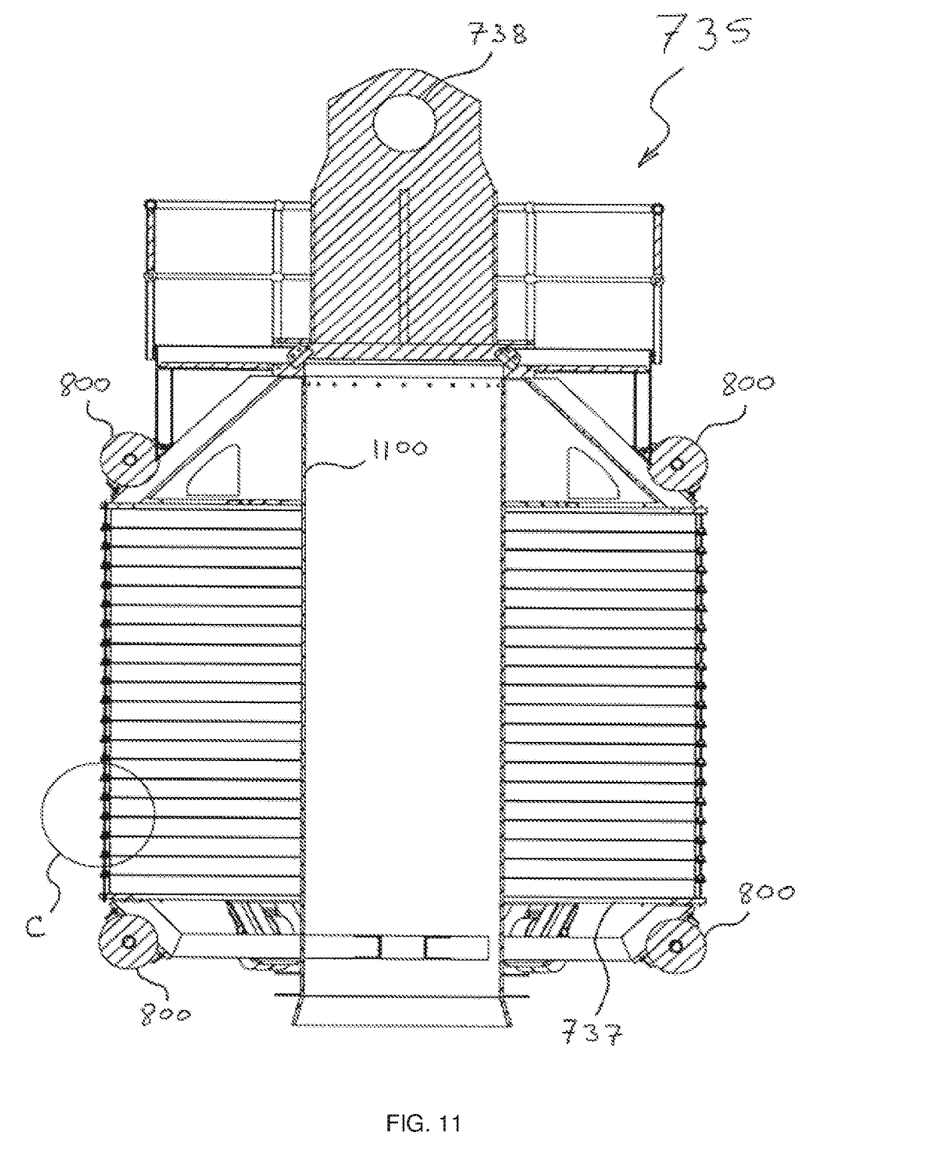
FIG. 11 is a cross sectional view of cross section A of FIG. 9.

FIG. 11 is a cross sectional view of the sealing subsystem 735, showing the cross section A of FIG. 9, including a circle defining Detail View C. A cylindrical core 1100 extends through the centre of the sealing subsystem 735 and functions as part of and as an extension of the inner shaft 705. The piston ring 737 is connected to external walls of the cylindrical core 1100, and supports the vertical rods 1045 that extend through the sealing ring assemblies 1025.

Figure 12:
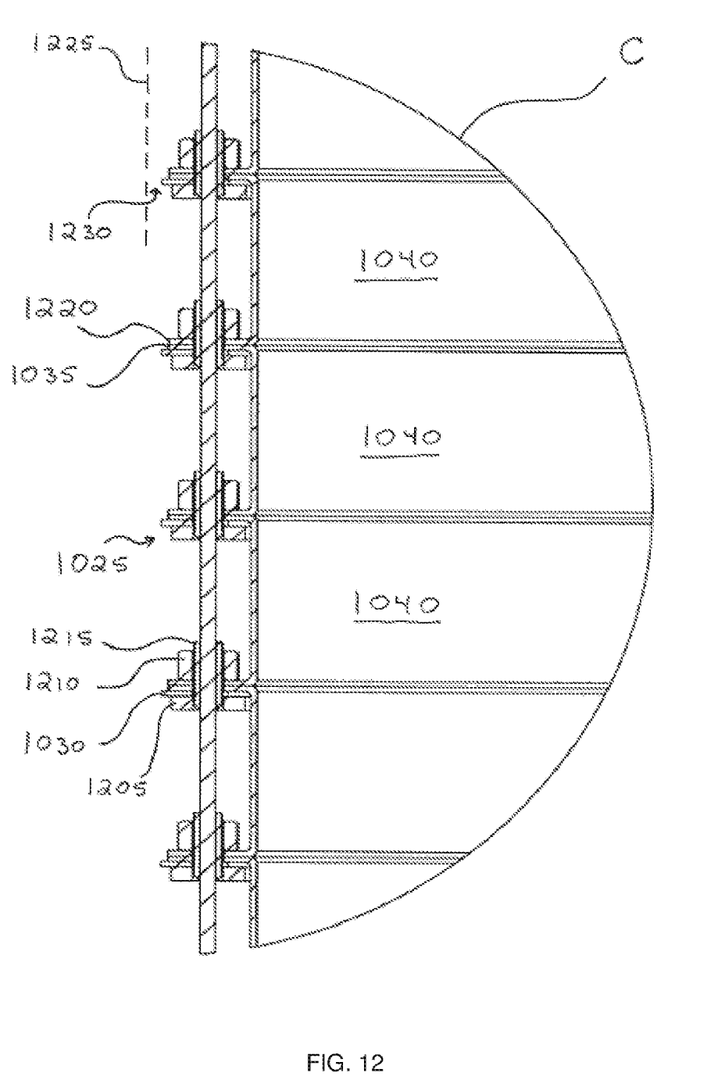
FIG. 12 is a close up of Detail View C from FIG. 11.

FIG. 12 is a close up of Detail View C from FIG. 11. As shown, in each sealing ring assembly 1025, the flexible sealing ring 1030 is clamped between a clamping ring 1205 and a nut 1210. The nuts 1210 are threaded onto bolts 1215 that are fixed to the clamping ring 1205. The upper lateral flange 1035 of each spacing hub 1040 is thus clamped against a lower lateral flange 1220 of an adjacent spacing hub 1040.

Dashed line 1225 designates a position of the inside wall of the hollow outer shaft 710. An annular seal gap 1230 (shown greater than actual size for illustration purposes) exists between an outer edge of each flexible sealing ring 1030 and the inside wall of the hollow outer shaft 710. When the non-contact liquid sealing actuator system 700 is at least partially immersed in an external liquid such that the at least one flexible sealing ring 1030 is submerged in the external liquid, a head of the external liquid above the at least one flexible sealing ring 1030 defines a backpressure in the annular seal gap 1230 that opposes the pressure applied by the pressure source to the cylinder cavity 739.

Those skilled in the art will appreciate that various embodiments of the present invention can be made of various materials, or a combination of various materials, including steel, metal alloys or high strength plastics or composites.

The above description of various embodiments of the present invention is provided for purposes of description to one of ordinary skill in the related art. It is not intended to be exhaustive or to limit the invention to a single disclosed embodiment. Numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A liquid sealing actuator system, comprising:
    an inner shaft having a first end;
    a hollow outer shaft having a first end that receives the first end of the inner shaft;
    at least one sealing ring positioned adjacent an internal surface of the hollow outer shaft, wherein the at least one sealing ring has an outer diameter that is less than an inner diameter of the hollow outer shaft, and wherein an outer wall of the at least one sealing ring, defining the outer diameter, is spaced apart from an inner wall of the hollow outer shaft, defining the inner diameter, thereby defining an annular seal gap;
    a mass attached to a distal end of the inner shaft or a distal end of the hollow outer shaft; and
    a pressure source that injects a pressurised fluid into the hollow outer shaft, thereby applying a pressure against both the first end of the inner shaft and the at least one sealing ring that assists in lifting the mass;
    wherein the liquid sealing actuator system is at least partially immersed in an external liquid such that the at least one sealing ring is submerged in the external liquid and a head of the external liquid above the at least one sealing ring defines a backpressure in the annular seal gap that opposes the pressure applied by the pressure source.

2. The liquid sealing actuator system of claim 1, wherein the mass defines a central wave device that oscillates vertically in the external liquid.

3. The liquid sealing actuator system of claim 2, wherein the central wave device generates waves in the external liquid.

4. The liquid sealing actuator system of claim 2, wherein the central wave device has a mass of greater than 500 tonnes.

5. The liquid sealing actuator system of claim 2, wherein the central wave device has a mass of less than 100 tonnes.

6. The liquid sealing actuator system of claim 1, further comprising:
    a sealing subsystem to which the at least one sealing ring is attached; and
    a plurality of wall spacing devices connected to the sealing subsystem, where some of the plurality of wall spacing devices are positioned above the at least one sealing ring and some of the plurality of wall spacing devices are positioned below the at least one sealing ring.

7. The liquid sealing actuator system of claim 1, wherein the at least one sealing ring comprises a plurality of sealing rings that are concentrically positioned along a longitudinal axis of the inner shaft.

8. The liquid sealing actuator system of claim 7, wherein the plurality of sealing rings are spaced apart by spacer hubs concentrically positioned along the longitudinal axis of the inner shaft.

9. The liquid sealing actuator system of claim 7, wherein the plurality of sealing rings comprises 2 to 30 sealing rings.

10. The liquid sealing actuator system of claim 7, wherein each sealing ring in the plurality of sealing rings comprises a plurality of identical interconnected segments.

11. The liquid sealing actuator system of claim 7, wherein the plurality of sealing rings are adjustably bolted to a piston ring that is fixed to the inner shaft.

12. The liquid sealing actuator system of claim 1, wherein a vertical operating range of the distal end of the hollow outer shaft extends above a level of the external liquid, and the distal end of the inner shaft is connected to a ground support.

13. The liquid sealing actuator system of claim 1, wherein a vertical operating range of the distal end of the inner shaft extends above a level of the external liquid, and the distal end of the hollow outer shaft is connected to a ground support.

14. The liquid sealing actuator system of claim 1, wherein the inner shaft and the hollow outer shaft are cylinders.

15. The liquid sealing actuator system of claim 14, wherein the inner shaft is configured to rotate about a longitudinal axis of the inner shaft and the hollow outer shaft is configured to rotate about a longitudinal axis of the hollow outer shaft, and wherein the inner shaft is configured to rotate independently of the hollow outer shaft.

16. The liquid sealing actuator system of claim 1, wherein during use the inner shaft oscillates in and out of the hollow outer shaft in a contactless manner, where the at least one sealing ring does not contact the internal surface of the hollow outer shaft.

17. The liquid sealing actuator system of claim 1, wherein a ratio of the annular seal gap divided by the outer diameter of the at least one sealing ring is less than 0.0005, and wherein the pressurised fluid and the external liquid are both water.

18. The liquid sealing actuator system of claim 1, wherein a plurality of inner and outer shaft systems support the mass.

19. A liquid sealing actuator system, comprising:
    an inner shaft having a first end;
    a hollow outer shaft having a first end that receives the first end of the inner shaft;
    at least one sealing ring positioned adjacent an internal surface of the hollow outer shaft, wherein the at least one sealing ring has an outer diameter that is less than an inner diameter of the hollow outer shaft, thereby defining an annular seal gap;
    a mass attached to a distal end of the inner shaft or a distal end of the hollow outer shaft; and
    a pressure source that injects a pressurised fluid into the hollow outer shaft, thereby applying a pressure against both the first end of the inner shaft and the at least one sealing ring that assists in lifting the mass;
    wherein the liquid sealing actuator system is at least partially immersed in an external liquid such that the at least one sealing ring is submerged in the external liquid and a head of the external liquid above the at least one sealing ring defines a backpressure in the annular seal gap that opposes the pressure applied by the pressure source;
    wherein the at least one sealing ring comprises a plurality of sealing rings that are concentrically positioned along a longitudinal axis of the inner shaft; and
    wherein the plurality of sealing rings are adjustably attached to the inner shaft.

20. A liquid sealing actuator system, comprising:
an inner shaft having a first end;
a hollow outer shaft having a first end that receives the first end of the inner shaft;
at least one sealing ring positioned adjacent an internal surface of the hollow outer shaft, wherein the at least one sealing ring has an outer diameter that is less than an inner diameter of the hollow outer shaft, thereby defining an annular seal gap;
a mass attached to a distal end of the inner shaft or a distal end of the hollow outer shaft; and
a pressure source that injects a pressurised fluid into the hollow outer shaft, thereby applying a pressure against both the first end of the inner shaft and the at least one sealing ring that assists in lifting the mass;
wherein the liquid sealing actuator system is at least partially immersed in an external liquid such that the at least one sealing ring is submerged in the external liquid and a head of the external liquid above the at least one sealing ring defines a backpressure in the annular seal gap that opposes the pressure applied by the pressure source; and
wherein the annular seal gap is maintained by wall spacing devices connected to, and positioned both above and below, the at least one sealing ring.

* * * * *